Feb. 4, 1969 F. REISFELD 3,425,613

SYSTEM FOR CONTROLLING THE STARTING AND STOPPING OF A CAPSTAN

Filed July 10, 1967

INVENTOR
FREDERICK REISFELD
BY Laurence J. Marhoefer
ATTORNEY

INVENTOR
FREDERICK REISFELD
BY Laurence J. Marhoefer
ATTORNEY

United States Patent Office 3,425,613

Patented Feb. 4, 1969

3,425,613

SYSTEM FOR CONTROLLING THE STARTING AND STOPPING OF A CAPSTAN

Frederick Reisfeld, Commack, N.Y., assignor to Potter Instrument Company, Inc., Plainview, N.Y., a corporation of New York

Filed July 10, 1967, Ser. No. 652,289

U.S. Cl. 226—178 5 Claims

Int. Cl. B65h *17/22, 17/28*

ABSTRACT OF THE DISCLOSURE

A timing pulse generator determines the starting and stopping intervals of a capstan motor in a single capstan magnetic tape transport as a function of the just previous interval.

*Background of the invention*

This invention relates to an open loop capstan motor control system for a single capstan magnetic tape transport and, more particularly, to an improved system that controls the starting and stopping intervals of the capstan motor.

A co-pending application entitled "Capstan Motor Power Supply," Ser. No. 643,994, filed June 6, 1967, assigned to the same assignee as this invention, discloses an open loop capstan motor control system in which a constant current is applied to the capstan motor for a predetermined interval to start and stop the motor. While the system disclosed in that application is generally satisfactory, it places an operating restriction on the computer in which such a transport is a component.

The interval of constant current required to accelerate the motor to a certain speed or decelerate it to rest is a fuction of its velocity at the beginning of the interval. Thusly, fixed intervals are satisfactory for accelerating the motor to full speed and decelerating it from full speed to rest, but such intervals are not satisfactory where it is desired that the computer system be capable of issuing start commands before the capstan has come to rest or stop commands before it has reached full speed.

*Summery of the invention*

Briefly, this invention contemplates the provision of an open loop capstan control system which has a timing pulse generator that produces an output pulse whose duration is a function of the duration of the just previous pulse.

The timing pulse generator includes a capacitor which is charged by a constant current source so that it generates a linear ramp potential; when the ramp reaches a certain level, it operates a transistor switch, establishing the normal starting interval. This level is maintained across the capacitor and upon receipt of the next command, the capacitor is discharged from this potential level at a constant rate back to a quiescent level, establishing the normal stopping interval.

A stop command received before the end of the normal starting interval, starts the capacitor discharge immediately, and, since the interval is proportional to the charge on the capacitor, this interval is a function of the just previous interval.

One object of this invention is to provide an open loop capstan motor control system which frees the computer system of program restrictions in respect of the interval between start-stop and stop-start commands.

Another object of the invention is the provision of such a control system where the starting interval is longer than the stopping interval.

Having briefly described this invention, it will be described in greater detail along with other objects and advantages in the following detailed description of a preferred embodiment which may be best understood by reference in the accompanying drawings which form part of the instant specification and which are to be read in conjunction therewith and which like reference numerals are used to indicate like parts in the various views:

*Description of the preferred embodiment*

Figure 1:
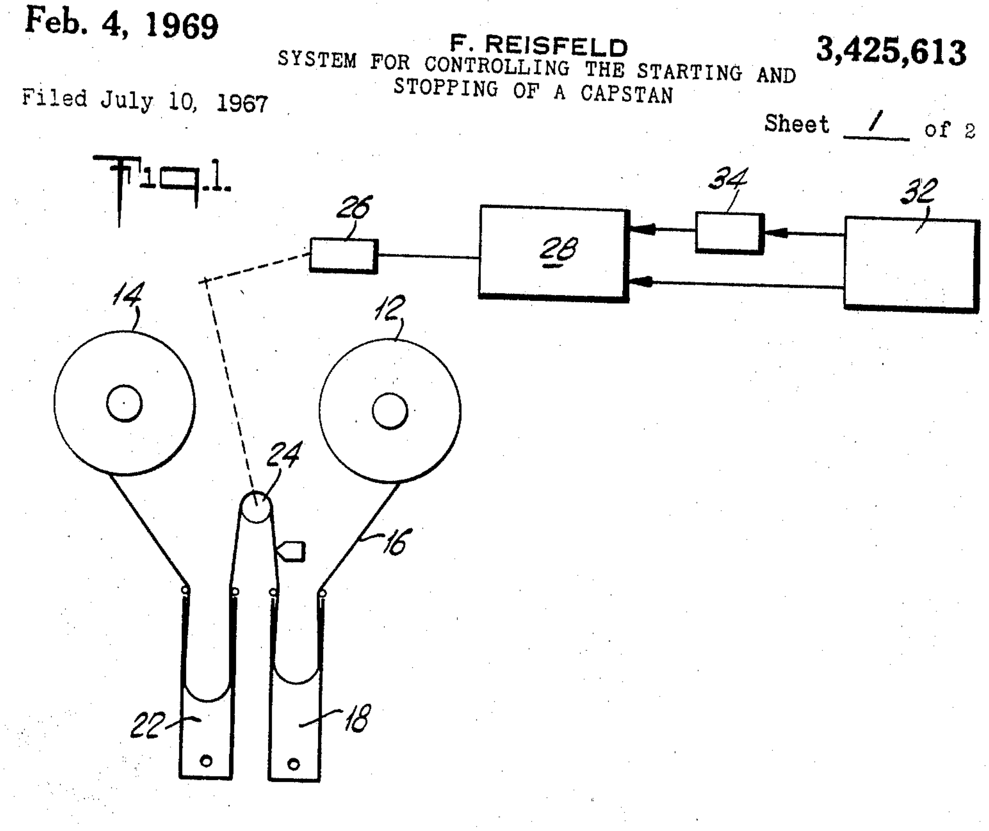
FIGURE 1 is a block diagram of a single capstan tape transport employing a capstan control system of this invention.

Referring now to FIGURE 1, a file reel 12 and a machine reel 14 are rotatably mounted on a magnetic tape transport frame (not shown). A magnetic tape 16 extends between these reels and a pair of vacuum buffers 18 and 22 serve to hold the tape 16 in constant frictional engagement with a centrally disposed capstan 24 and to form buffering loops in the tape. Sensors (not shown) in the vacuum columns 18 and 22 control the rotation of the reels 12 and 14 in a manner well known to those skilled in the art.

A low inertia D.C. motor 26, which is directly coupled to the capstan 24, is energized by a power supply 28 which conveniently may be the same as that disclosed in the aforementioned application Ser. No. 643,994. The output of power supply 28 is controlled by a computer or tape control unit 32 in combination with a timing pulse generator 34, which is shown in detail in FIGURE 2. As is well known to those skilled in the art, the starting, moving and stopping of the tape 16 is controlled by the motor 26.

Figure 2:
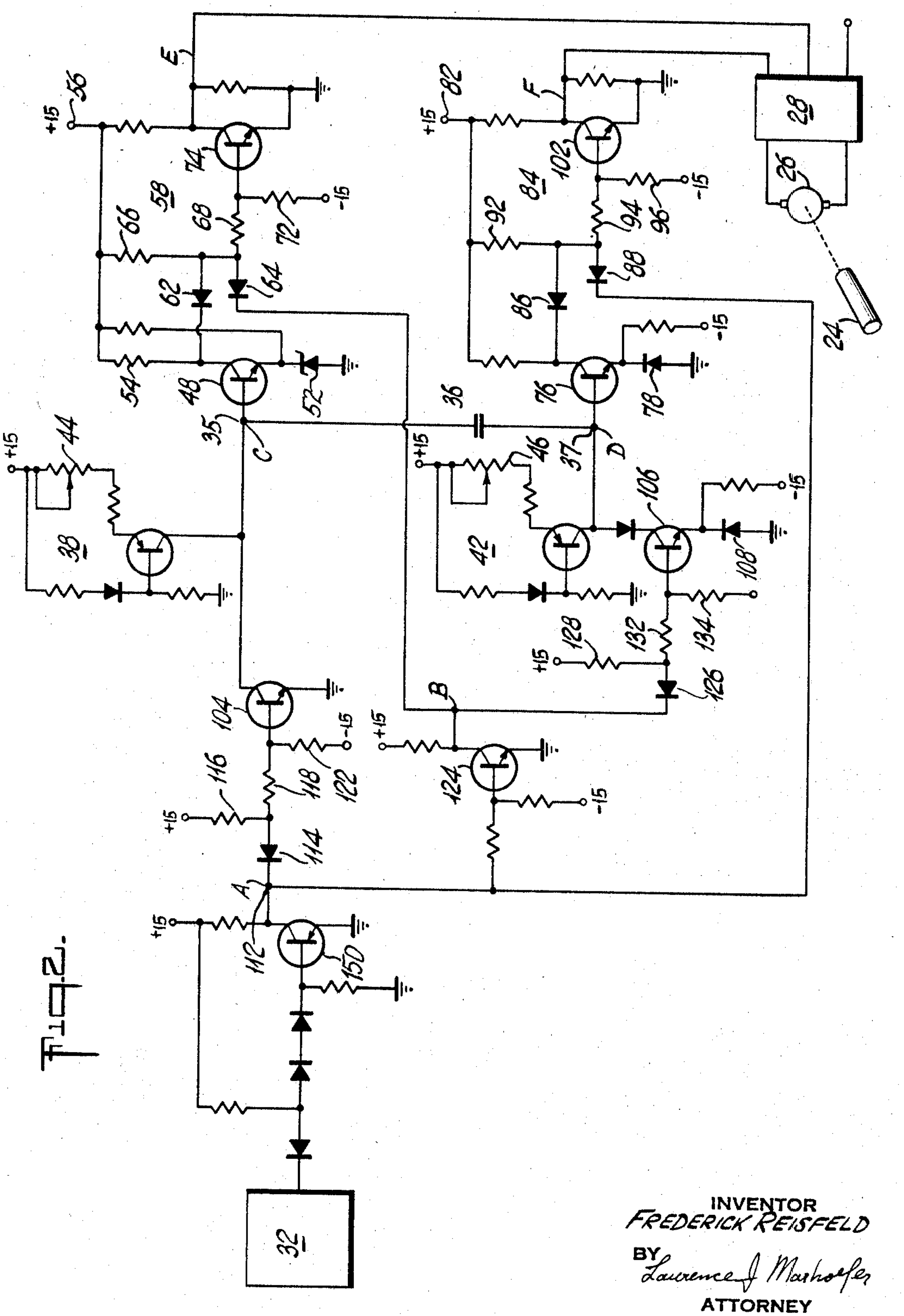
FIGURE 2 is a schematic diagram of a timing pulse generator of this invention.

Referring now to FIGURE 2, one terminal 35 of a ramp generating capacitor 36 is coupled to a constant current generator 38 and its other terminal 37 is coupled to another constant current generator 42. The generators 38 and 42 charge and discharge the capacitor 36 at a constant rate to produce a linear ramp, in a manner to be more fully described hereinafter. It should be noted that the charging and discharging rates can be controlled by means of potentiometers 44 and 46 to the end that these rates may be made equal or unequal as desired, and that these rates may be varied in order to vary starting and stopping intervals, respectively. Advantageously, the starting interval is greater than the stopping interval owing to the fact that frictional forces resisting the start forces and aid the stopping forces.

Terminal 35 is coupled to the base of a potential or level responsive circuit comprising transistor 48 whose emitter is coupled via a Zener diode 52 to ground and whose collector is coupled via a resistor 54 to a potential source 56. Transistor 48 is so biased that it is cut off until the potential at terminal 35 exceeds the breakdown voltage of the Zener diode 52 and base emitter voltage drop of transistor 48.

The collector of transistor 48 is coupled to an AND gate 58 which includes diodes 62 and 64, and a network of biasing resistors 66, 68 and 72 all coupled to the base of a transistor 74. Transistor 74 is biased to saturation so long as diodes 62 and 64 are back biased; when either of these diodes is forwardly biased, transistor 74 is biased to cut off. As will be explained in more detail hereinafter, the starting interval is the interval that transistor 74 is in saturation.

The other terminal 37 of capacitor 36 is coupled to the base of another potential or level responsive circuit comprising a transistor 76 whose emitter is coupled via a forwardly biased diode 78 to ground. The collector of transistor 76 is coupled to a source of positive potential 82, and transistor 76 is biased to cut off so long as the potential at terminal 37 is at ground potential or less. When the potential at terminal 37 rises above ground (or slightly above ground owing to the difference between base emitter drop and the drop across diode 78), transistor 76 is biased to saturation.

The collector of transistor 76 is coupled as one input to another AND gate 84 which includes diodes 86 and 88, and a network of biasing transistors 92, 94 and 96 all coupled to the base of a transistor 102. Transistor 102 is biased to saturation so long as diodes 86 and 88 are back bised; when either of these diodes is forwardly biased, transistor 102 is cut off. The stopping interval is the interval that transistor 102 is in saturation.

A transistor 104 clamps terminal 35 to ground when in saturation, and when cut off, it permits capacitor 36 to be charged from constant current source 38. Similarly, a transistor 106 clamps terminal 37 to ground when in saturation and permits capacitor 36 to be charged from source 38 when cut off. It should be noted that the emitter of transistor 106 is coupled to ground via forwardly biased diode 108 so that the drop from terminal 37 to ground via transistor 106 is closely matched to the drop from this same terminal to ground via transistor 76.

The voltage level at a terminal 112, which is coupled to the base of transistor 104 via biasing network that includs a diode 114 and resistors 116, 118 and 122, switches transistor 104 between saturation and cut off. Transistor 104 is biased to saturation so long as diode 114 is back biased, and is cut off when diode 114 is forwardly biased.

Similarly, the base of transistor 106 is coupled to input terminal 112 via an inverting transistor 124 and a biasing network that includes diode 126 and resistors 128, 132 and 134. Transistor 106 is biased to saturation so long as diode 126 is back biased and is cut off when diode 126 is forwardly biased.

Terminal 112 is also coupled to the anode of diode 88 and serves as the other input to AND gate 84. Similarly, terminal 112 is coupled to the anode of diode 64 via inverting transistor 124.

In the embodiment of FIGURE 2, the controller 32 is coupled to terminal 112 via an inverting transistor 150; its output signal places terminal 112 at ground potential for starting and running and at about +7.5 volts for stopping and when the motor is at rest, for example.

Figure 3:
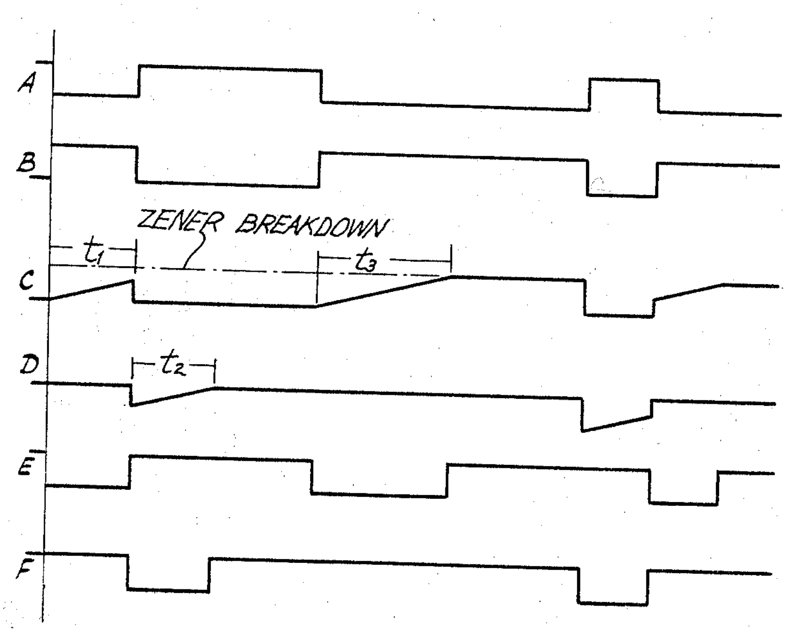
FIGURE 3 is a timing diagram showing idealized waveforms designated A through F for various points of the circuit of FIGURE 2 indicated by letters A through F.

Referring now to FIGURE 3 in addition to FIGURE 2, in starting the motor 26 from rest, an input from controller 32 causes transistor 150 to saturate, coupling terminal 112 (A) to ground, and cutting off transistor 104. The collector of inverting transistor 124 (B) rises to +15 volts (for example) back biasing diode 64, and since diode 62 is likewise back biased, transistor 74 is in saturation. The output of gate 58 (E), therefore, rests at ground potential. It should be noted that diode 88 is forwardly biased, transistor 102 is cut off, and that the output of gate 84 (F) is about +7.5 volts.

With transistor 104 cut off, constant current source 38 starts charging capacitor 36 via transistor 106, which is biased to saturation. The potential at terminal 35 (C) rises linearly. Illustrated in FIGURE 3, a stop command is issued by controller 32 before the potential at terminal 35 reaches the breakdown potential of Zener diode 52. This stop command raises the potential of terminal 112 to +15 volts and the collector of transistor 104 drops to ground. Transistor 104 saturates clamping terminal 35 to ground, and transistor 106 is cut off. As will be appreciated by those skilled in the art, coupling the positive side of charged capacitor 36 (terminal 35) to ground in effect negatively charges the capacitor by the same amount and terminal 37 (D) drops to a negative potential equal to the previously attained positive potential at terminal 35 (C).

Diodes 88 and 86 are now back biased, driving transistor 102 into saturation; diode 64 is forwardly biased cutting off transistor 74.

Constant current source 42 now starts charging capacitor 36 through transistor 106. When terminal 37 rises to ground potential, transistor 76 saturates forwardly biasing diode 86, cutting off transistor 102. It should be noted that the interval $t_2$ required for the capacitor 36 to be charged to ground is a function of its initial charge and is, therefore, approximately equal to the just previous starting interval $t_1$.

It will be further appreciated that potentiometers 44 and 46 can be used to vary the charging rates of capacitor 36 to the end that the functional relationship is maintained although the intervals $t_1$ and $t_2$ are unequal. At the end of the interval $t_2$, the capacitor motor 26 is at rest.

At the next start command, the process just described is repeated. Here, however, it is assumed that no stop command is received before the motor 26 attains full speed. In this instance, the potential at terminal 35 rises linearly until the breakdown voltage of Zener diode 52 is reached. Transistor 48 then saturates, forwardly biasing diode 62 cutting off transistor 74. At the end of interval $t_3$, which is the starting interval under usual operation, the motor is up to full speed. The potential at terminal 35 remains at the breakdown potential of diode 52 until the next stop command is received. When a stop command is next received, the stop cycle is again initiated in the manner previosly described. As will be appreciated from an inspection of FIGURE 3, operation when a start command is issued before the motor has come to rest is similar to the operation previously described.

Thus, it will be appreciated that the objects of the invention have been accomplished. The controller 32 is free of program restrictions in respect of the interval between start-stop commands yet the starting interval may be made longer than the stopping interval, if desired.

It will be understood that certain features and subcombinations are of utility and may be employed without reference to other features and subcombinations. This is contemplated by and is within the scope of the claims. It is further obvious that various changes may be made in details within the scope of the claims without departing from the spirit of the invention. It is, therefore, to be understood that this invention is not to be limited to the specific details shown and described.

What is claimed is:

1. A system for controlling the starting and stopping of a capstan in a single capstan tape transport comprising, in combination;
   - a low inertia motor directly coupled to said capstan for driving said capstan,
   - means for energizing said motor with a certain current waveform for a certain interval during starting,
   - means for energizing said motor with a certain current waveform for a certain interval during stopping, and
   - means for establishing said starting and stopping intervals as a function of the just previous interval of starting or stopping.

2. A system for controlling the starting and stopping of a capstan as in claim 1 wherein said certain current waveform is a constant current.

3. A system for controlling the starting and stopping of a capstan as in claim 2 wherein said interval establishing means includes means for varying the starting interval and means for varying the stopping interval.

4. A system for controlling the starting and stopping of a capstan as in claim 3 wherein said interval establishing means includes a capacitor having a first and second terminal, means for coupling a constant current source of one polarity connected to said first terminal, means for coupling a constant current source of said one polarity connected to said second terminal, means for coupling said first terminal to a first reference potential in response to a stop command signal, means for coupling said second terminal to a second reference potential in response to a start command signal, a potential level sensitive circuit connected to said first terminal for producing an output when the potential at said first terminal reaches a first certain level, and potential level sensitive circuit connected to said second terminal for producing an output signal when the level at said second terminal reaches a second certain level.

5. A system for controlling the starting and stopping of a capstan as in claim 4 wherein said second certain level and said first and second reference potentials are substantially equal.

References Cited

UNITED STATES PATENTS

| | | | |
|---|---|---|---|
| 3,185,364 | 5/1965 | Kleist. | |
| 3,293,522 | 12/1966 | Lewis. | |
| 3,318,545 | 5/1967 | Tobey. | |
| 3,394,854 | 7/1968 | Grace | 226—49 |

ALLEN N. KNOWLES, *Primary Examiner.*

U.S. Cl. X.R.

226—188

Disclaimer 3,425,613.—*Frederick Reisfeld*, Commack, N.Y. SYSTEM FOR CONTROLLING THE STARTING AND STOPPING OF A CAPSTAN. Patent dated Feb. 4, 1969. Disclaimer filed Apr. 21, 1976, by the assignee, *Potter Instrument Company, Inc.*

Hereby enters this disclaimer to claim 1 of said patent.

[*Official Gazette June 15, 1976.*]